US008650473B2

(12) United States Patent
Fukasawa (10) Patent No.: US 8,650,473 B2
(45) Date of Patent: Feb. 11, 2014

(54) DOCUMENT MANAGING APPARATUS, DOCUMENT MANAGING METHOD, AND STORAGE MEDIUM (75) Inventor: Yusuke Fukasawa, Tokyo (JP)

(73) Assignee: Canon Kabushiki Kaisha, Tokyo (JP)

(*) Notice: Subject to any disclaimer, the term of this patent is extended or adjusted under 35 U.S.C. 154(b) by 53 days.

(21) Appl. No.: 12/992,779

(22) PCT Filed: Jul. 3, 2009

(86) PCT No.: PCT/JP2009/062561
§ 371 (c)(1),
(2), (4) Date: Nov. 15, 2010

(87) PCT Pub. No.: WO2010/005063
PCT Pub. Date: Jan. 14, 2010

(65) Prior Publication Data
US 2011/0072019 A1 Mar. 24, 2011

(30) Foreign Application Priority Data
Jul. 11, 2008 (JP) ................................. 2008-182036

(51) Int. Cl.
G06F 17/00 (2006.01)
(52) U.S. Cl.
USPC .......................................... 715/209; 715/251
(58) Field of Classification Search
USPC .................................................. 715/209, 251
See application file for complete search history.

(56) References Cited

U.S. PATENT DOCUMENTS 5,893,127 A    4/1999  Tyan et al. ..................... 707/513
6,614,432 B1*  9/2003  Merrill .......................... 345/428
(Continued)

FOREIGN PATENT DOCUMENTS

CN    1453747 A    11/2003
CN    1577328 A    2/2005
(Continued)

OTHER PUBLICATIONS

Jan. 20, 2011 Notification Concerning Transmittal of International Preliminary Report on Patentability (PCT/IB/326), Jan. 11, 2011 International Preliminary Report on Patentability (PCT/IB/373), and Sep. 29, 2009 Written Opinion of the International Searching Authority (PCT/ISA/237) in counterpart PCT Application No. PCT/JP2009/062561.

(Continued)

Primary Examiner — Nathan Hillery
(74) Attorney, Agent, or Firm — Fitzpatrick, Cella, Harper & Scinto (57) ABSTRACT An object list LO in which information of each object included in a structured document has been collected in a list format is formed. Objects in which a distance in the vertical direction of a document is equal to a threshold value or less are included in one object group and the objects in the object group G are grouped as one group. After that, in the case where a length in the horizontal direction of each of circumscribed rectangles of two or more objects included in the object group G is equal to a length in the vertical direction or more and a length in the horizontal direction of at least one of the two or more objects is smaller than a threshold value, a block reforming process is executed. In the block reforming process, among the objects in the object group G, the objects in which the distance in the horizontal direction is equal to the threshold value or less are grouped as one object group GC.

6 Claims, 8 Drawing Sheets

(56) References Cited

U.S. PATENT DOCUMENTS

| | | | |
|---|---|---|---|
| 6,731,777 B1 * | 5/2004 | Nishigaki et al. | 382/106 |
| 6,853,738 B1 * | 2/2005 | Nishigaki et al. | 382/106 |
| 7,058,232 B1 * | 6/2006 | Miyake | 382/252 |
| 7,164,797 B2 | 1/2007 | Simard et al. | |
| 7,343,046 B2 | 3/2008 | Curry et al. | |
| 7,376,275 B2 | 5/2008 | Simard et al. | |
| 7,428,700 B2 | 9/2008 | Wen et al. | |
| 7,613,995 B2 | 11/2009 | Wen et al. | |
| 8,189,229 B2 | 5/2012 | Mori | |
| 2003/0202709 A1 | 10/2003 | Simard et al. | |
| 2005/0028077 A1 | 2/2005 | Wen et al. | |
| 2005/0180647 A1 | 8/2005 | Curry et al. | |
| 2005/0271281 A1 | 12/2005 | Simard et al. | |
| 2006/0106798 A1 | 5/2006 | Wen et al. | |
| 2006/0171002 A1 | 8/2006 | Mori | |
| 2007/0038937 A1 * | 2/2007 | Asakawa et al. | 715/730 |
| 2007/0065013 A1 * | 3/2007 | Saund et al. | 382/186 |
| 2007/0127056 A1 * | 6/2007 | Hirano et al. | 358/1.14 |

FOREIGN PATENT DOCUMENTS

| | | |
|---|---|---|
| CN | 1655584 A | 8/2005 |
| CN | 1816097 A | 8/2006 |
| CN | 101030257 A | 9/2007 |
| EP | 0 843 276 A1 | 5/1998 |
| JP | 05-040849 | 2/1993 |
| JP | 9-120443 A | 5/1997 |
| JP | 10-162003 | 6/1998 |

OTHER PUBLICATIONS

Chinese Office Action dated Aug. 24, 2012, in counterpart Chinese Application No. 200980127100.8, and English-language translation thereof.

* cited by examiner

DOCUMENT MANAGING APPARATUS, DOCUMENT MANAGING METHOD, AND STORAGE MEDIUM

TECHNICAL FIELD

The invention relates to a document managing apparatus, a document managing method, and a computer program. More particularly, the invention is suitable when it is used to block-form a drawing object such as figure, character string, image, or the like in a document.

BACKGROUND ART

Hitherto, there is a block forming technique for block-forming (segmenting) an area of a document image. As such a block forming technique, there is a method of applying an image area separation (block selection) to image data of a document. According to such a method, the area of the document image is extracted by using a technique such as histogram, graph dividing method, or the like. As a technique using such a method, there is a technique disclosed in the Official Gazette of Japanese Patent Application Laid-Open No. H05-40849. In the Official Gazette of Japanese Patent Application Laid-Open No. H05-40849, first, the image data is scanned in the lateral direction and in the vertical direction and a histogram of a longest white run width is formed. An area extracting process is executed by using the formed histogram and an extracted area is classified into attributes of one of a field separator area, a photograph area, a graphics area, and another character area.

However, in the foregoing related art, it is a prerequisite that data serving as a target to be block-formed is an image. Therefore, in the case of applying the related art to, for example, a structured document, it is necessary to temporarily rasterize drawing data in the structured document and to further perform the image area separation by using the technique such as histogram or graph division. There is, consequently, such a problem that it takes a long time until the block formation (extraction of the area) is completed.

The invention is made in consideration of such a problem and it is an object of the invention to enable an area of a document image to be block-formed at a speed higher than that in the related art.

DISCLOSURE OF THE INVENTION

To solve the above problem, according to the invention, there is provided a document managing apparatus comprising: a first grouping unit that adds an object in which a first distance which is a distance between objects in a document and is a distance in a first direction of the document is equal to a threshold value or less to a first object group, thereby grouping; and a second grouping unit that, in the case where a second distance which is a distance among a plurality of objects in the first object group and is a distance in a direction different from that of the first distance does not lie within the threshold value, classifies the groups so that the plurality of objects belong to another object group.

Further features of the present invention will become apparent from the following description of exemplary embodiments with reference to the attached drawings.

BEST MODE FOR CARRYING OUT THE INVENTION

An embodiment of the invention will be described hereinbelow with reference to the drawings. In the embodiment, an example in the case of automatically block-forming drawing objects (hereinbelow, abbreviated to as objects as necessary in the following description) included in a structured document will be described. The structured document is a document formed by a markup language and is a document in which by inserting tags showing a structure of the document into the document in order to execute management and processes in a computer, a logical structure is defined. Therefore, although the document is text data, it becomes document data which can be used without being subjected to a restriction of the OS or software while having the complicated document structure and which has a high generality degree.

Figure 1:
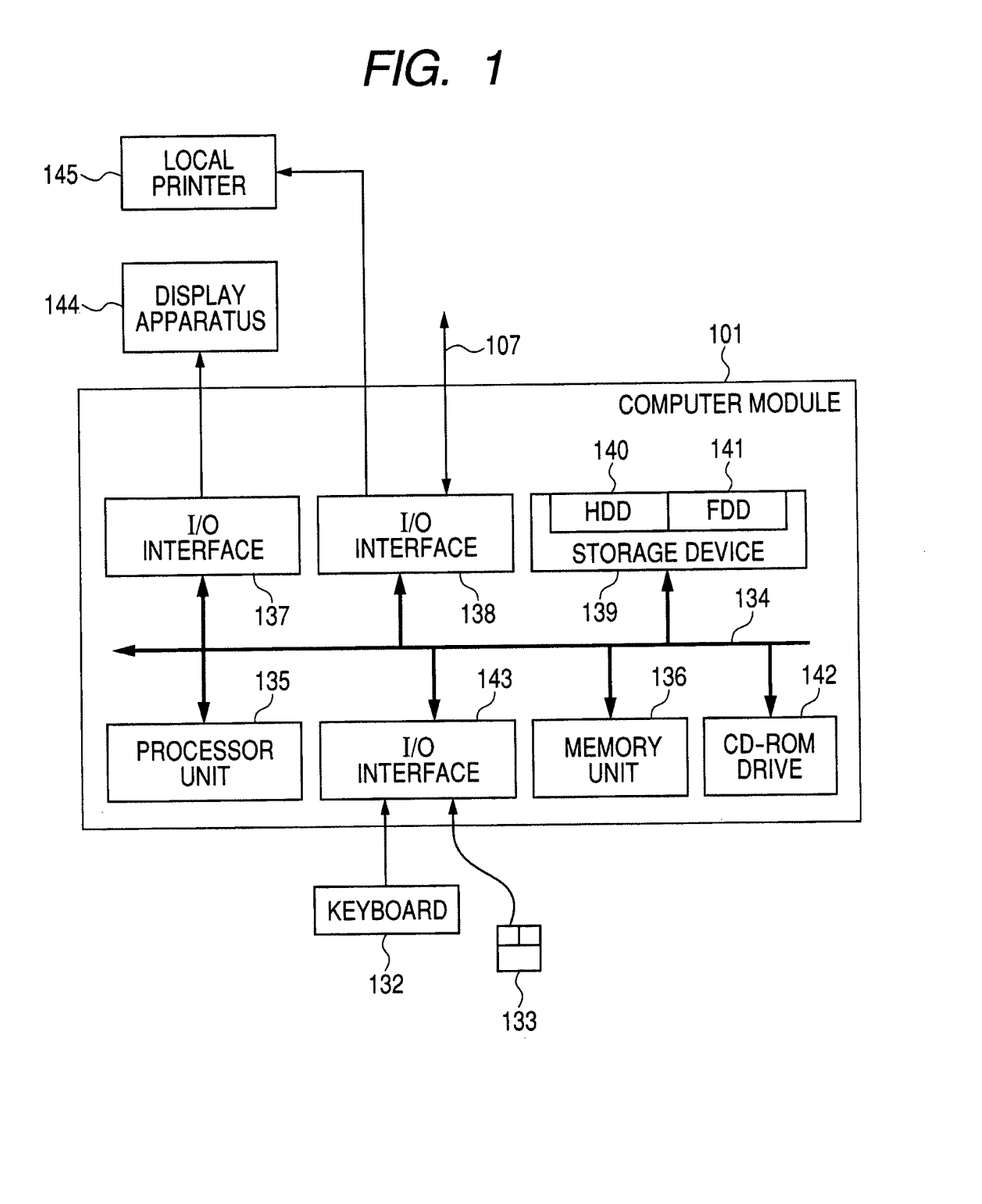
FIG. 1 is a diagram showing an embodiment of the invention and illustrating an example of a system construction of a document managing apparatus for executing a page layout (block forming process).

FIG. 1 is a diagram illustrating an example of a system construction of a document managing apparatus for executing a page layout (block forming process). In FIG. 1, input devices such as keyboard 132, pointing device like a mouse 133, and the like are connected to a computer module 101 through an input/output interface (I/O interface) 143. A display apparatus 144 and, according to circumstances, an output apparatus including a local printer 145 are connected to the computer module 101. An input/output interface (I/O interface) 138 connects the computer module 101 to a network 107 and connects the computer module 101 to other external computer apparatuses so that the computer module 101 can communicate therewith. As a network 107, for example, a local area network (LAN), a wide area network (WAN), or an Internet can be mentioned.

The computer module 101 has at least one processor unit (CPU) 135. The computer module 101 also has a memory unit 136 constructed by having, for example, a random access memory (RAM) of a semiconductor and a read only memory (ROM) of a semiconductor. The computer module 101 also has: an input/output (I/O) interface including a video interface 137; and the foregoing I/O interface 143 for mutually connecting the keyboard 132 and the mouse 133 to the computer module 101.

Further, the computer module 101 has a storage device 139 including, for example, a hard disk drive (HDD) 140 and a flexible disk drive (FDD) 141. Although not illustrated in FIG. 1, there is also a case where a magnetic tape drive or the like is included in the storage device 139. A CD-ROM drive 142 is provided as a non-volatile data source. The computer module 101 executes processes by using: an operating system such as LINUX (registered trademark) or WINDOWS (registered trademark); and the components 135 to 143 of the computer module 101 for communicating through a mutually-connecting bus 134.

Software for realizing procedures illustrated in the following flowcharts is stored into, for example, a "readable medium of the computer module 101" including the storage device 139. The software is loaded into the memory unit 136 from the readable medium of the computer module 101 and is executed by the processor unit (CPU) 135. By using computer program products by the computer module 101, the document managing apparatus can be made operative as an apparatus that is advantageous to a layout edition of a document.

Figure 2:
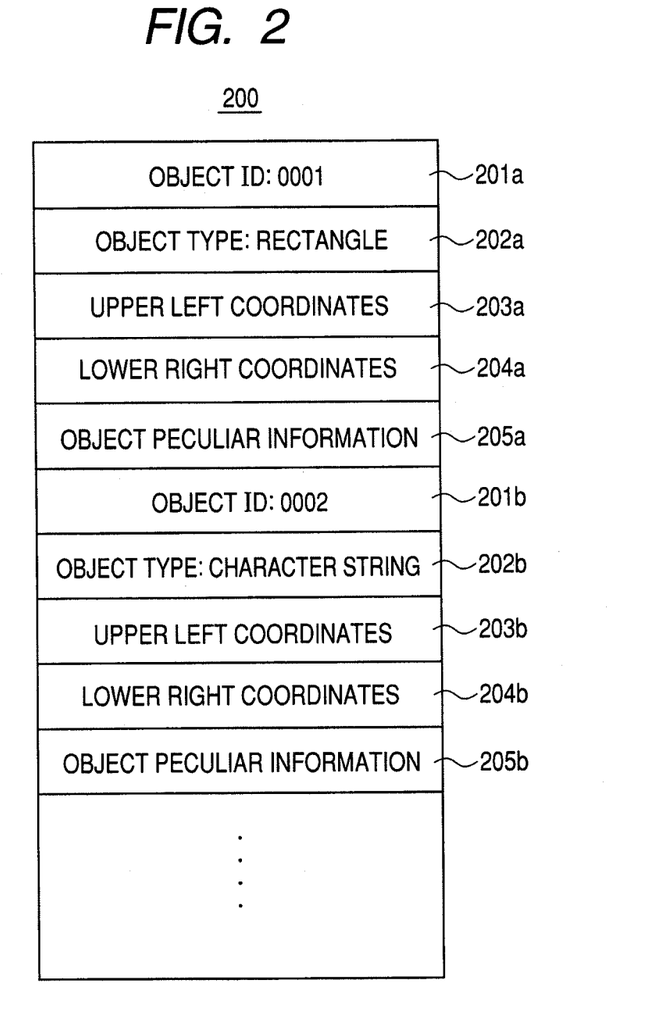
FIG. 2 is a diagram showing the embodiment of the invention and illustrating an example of an object list.

FIG. 2 is a diagram illustrating an example of an object list. An object list 200 illustrated in FIG. 2 is stored into, for example, the HDD 140. In the embodiment, the computer module 101 manages information of objects in a structured document by using the object list 200 as illustrated in FIG. 2. As illustrated in FIG. 2, the information of each object has been stored as a list structure in the object list 200. An object ID 201, an object type 202, upper left coordinates 203, lower right coordinates 204, and object peculiar information 205 are included in the information of each object. The upper left coordinates 203 and the lower right coordinates 204 are information showing a position of the object.

Figure 3:
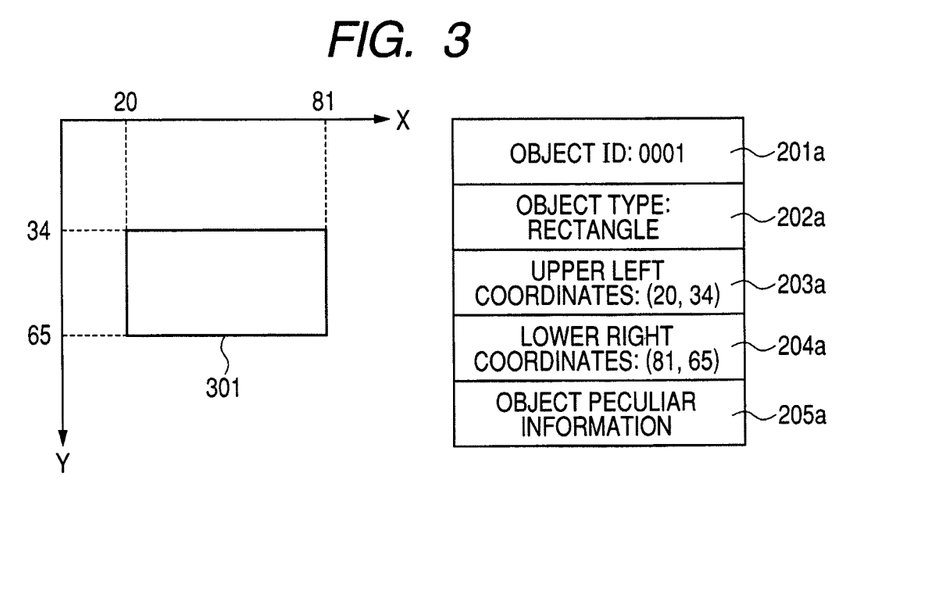
FIG. 3 is a diagram showing the embodiment of the invention and illustrating an example of a relation between information of an object which is stored into the object list and an actual object.

FIG. 3 is a diagram illustrating an example of a relation between the information of the object which is stored into the object list 200 and an actual object. As illustrated in FIG. 3, information of a rectangular object 301 existing at a position in which upper left coordinates 203a are equal to (20, 34) and lower right coordinates 204a are equal to (81, 65) is stored (registered) into the object list 200 by contents illustrated in a right diagram of FIG. 3.

Figure 4:
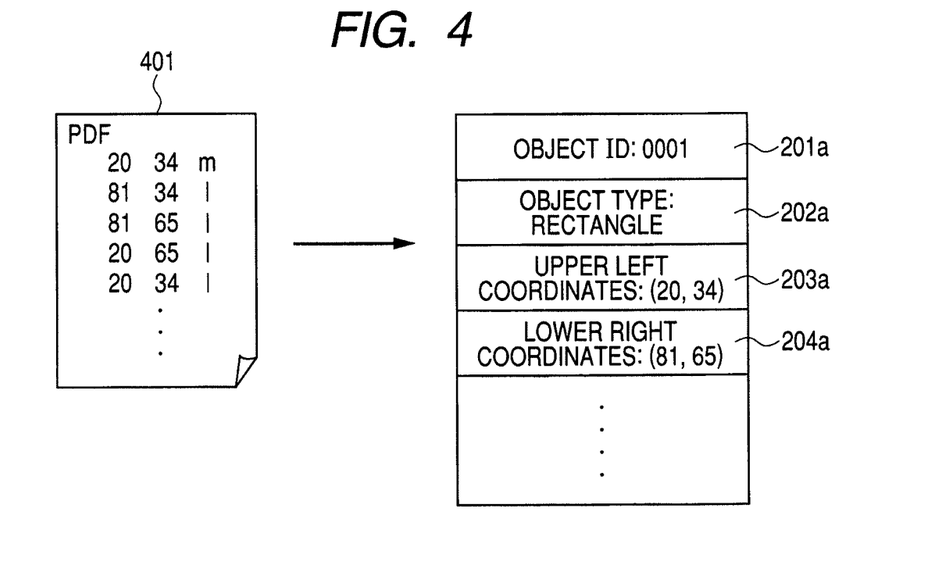
FIG. 4 is a diagram showing the embodiment of the invention and conceptually illustrating an example in which a rectangular object is read out of a structured document of a PDF format and information of this object is extracted.

FIG. 4 is a diagram conceptually illustrating an example in which the rectangular object 301 as illustrated in FIG. 3 is read out of a structured document of a PDF format and the information of this object is extracted. Although an example of a structured document 401 of the PDF format is mentioned and illustrated as a structured document in FIG. 4, the structured document is not limited to such a document. For example, a structured document of XPS (XML Paper Specification), SVG (Scalable Vector Graphics), or the like can be also processed in a manner similar to the structured document of the PDF format. A structured document of OOXML (Office Open XML), ODF (Open Document Format), or the like can be also processed in a manner similar to the structured document of the PDF format.

Figure 5:
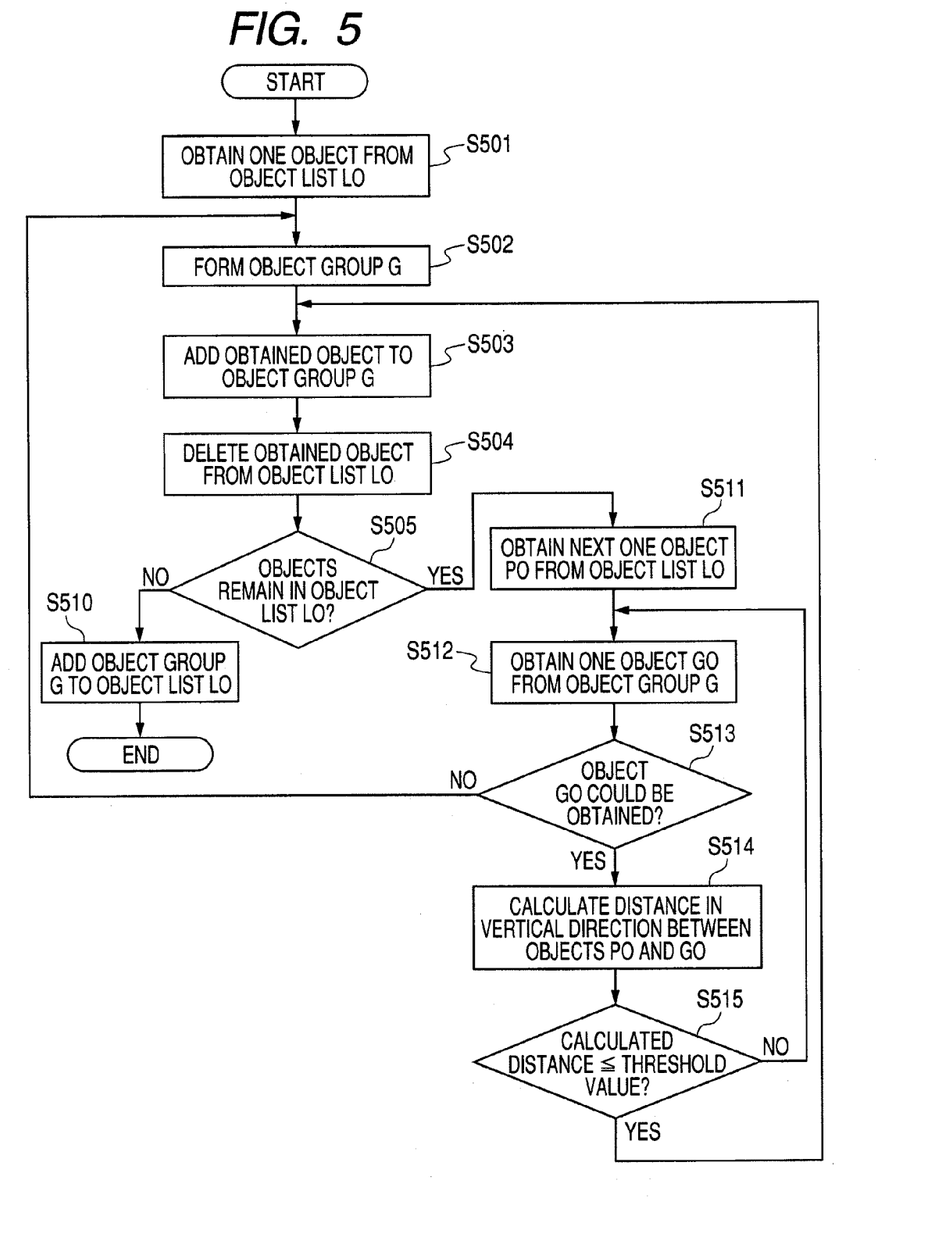
FIG. 5 is a flowchart showing the embodiment of the invention and describing an example of a process of a layout processing unit of the document managing apparatus at the time of block-forming the objects of the structured document.

FIG. 5 is a flowchart for describing an example of a process of a layout processing unit of the document managing apparatus at the time of block-forming the objects of the structured document. In the embodiment, the layout processing unit can be realized by using the processor unit (CPU) 135, memory unit 136, HDD 140, or the like. The procedures illustrated in the flowcharts have been stored in either the memory unit (RAM or ROM) 136 or the HDD 140 and are executed by the processor unit (CPU) 135.

First, the layout processing unit obtains one of the objects from an object list LO (step S501). The object list LO is, for example, the object list 200 illustrated in FIG. 2. Subsequently, the layout processing unit forms a new object group G (step S502). The object group G has a format similar to that of the object list LO and has a data format which can be operated as one object by the layout processing unit. Subsequently, the layout processing unit adds the object obtained in step S501 to the formed object group G (step S503). Subsequently, the layout processing unit deletes the object added to the object group G from the object list LO (step S504).

Subsequently, the layout processing unit discriminates whether or not the objects still remain in the object list LO (step S505). If no objects remain in the object list LO as a result of the discrimination, the layout processing unit adds the object group G to the object list LO (step S510). The processes according to the flowchart of FIG. 5 are finished.

If the objects remain in the object list LO, the layout processing unit obtains a next object PO from the object list LO (step S511).

Subsequently, the layout processing unit obtains one object GO from the object group G (step S512). Subsequently, the layout processing unit discriminates whether or not the object GO could be obtained from the object group G (step S513). If the object GO cannot be obtained from the object group G as a result of the discrimination, the layout processing unit returns to step S502 mentioned above. If the object GO could be obtained from the object group G, the layout processing unit calculates a distance in the vertical direction between the object PO obtained in step S511 and the object GO obtained in step S512 (step S514).

Figure 6:
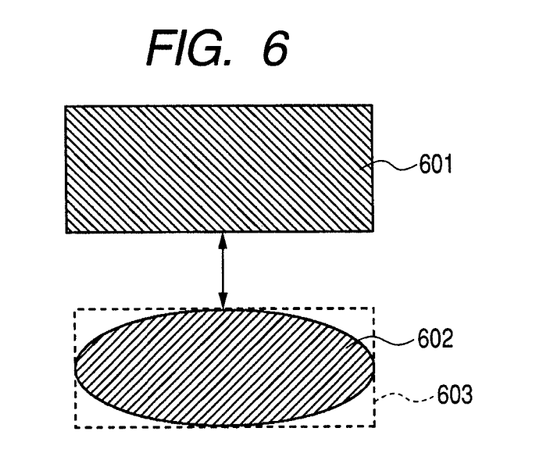
FIG. 6 is a diagram showing the embodiment of the invention and describing an example of a distance in the vertical direction between two objects.

FIG. 6 is a diagram for describing an example of a distance in the vertical direction between two objects. As illustrated in FIG. 6, in the embodiment, the distance between the objects denotes a shortest distance between circumscribed rectangles surrounding objects 601 and 602. In the example illustrated in FIG. 6, the object 601 is a rectangle and the object 602 is an ellipse. Therefore, the layout processing unit forms a circumscribed rectangle 603 of the elliptic object 602 and calculates a shortest distance 604 in the vertical direction between the circumscribed rectangle 603 and the rectangular object 601 as a distance in the vertical direction between the two objects 601 and 602.

Returning to the description of FIG. 5, the layout processing unit discriminates whether or not the distance calculated in step S514 is equal to a threshold value or less (step S515). If the distance calculated in step S514 is larger than the threshold value as a result of the discrimination, the processing routine is returned to step S503 mentioned above. The threshold value denotes a distance of a certain value which is predetermined in the system. In the embodiment, the objects which are block-formed are separated in the vertical direction by the threshold value of the distance.

As mentioned above, in the embodiment, for example, the vertical direction of the document is an example of the first direction, the distance calculated in step S514 is an example of the first distance, and the object group G is an example of the first object group. For example, by executing the process of step S503, an example of the first grouping unit is realized.

Figure 7:
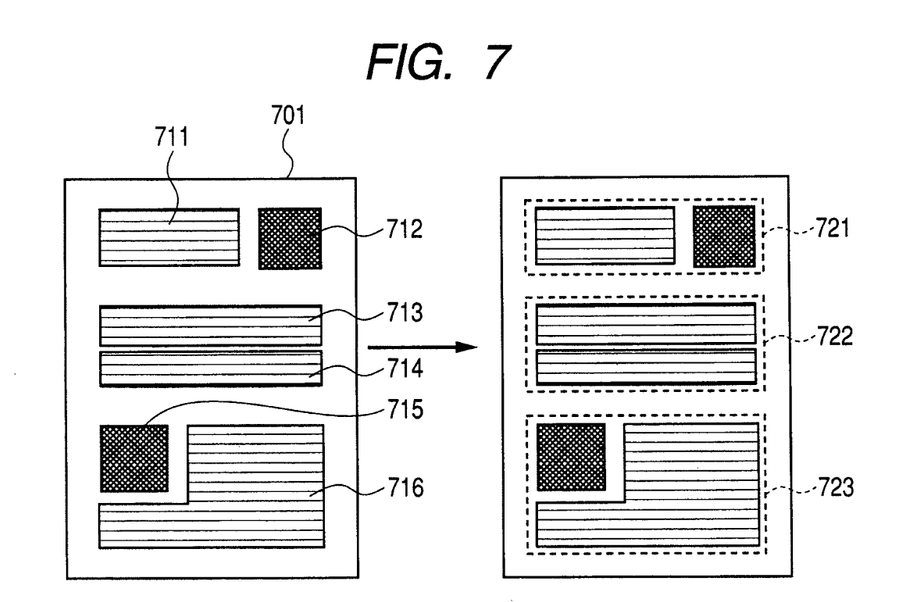
FIG. 7 is a diagram showing the embodiment of the invention and illustrating an example of a document and a result obtained by block-forming objects of the document by the flowchart of FIG. 5.

FIG. 7 is a diagram illustrating an example of a document and a result obtained by block-forming objects of the document by the flowchart of FIG. 5. As illustrated in FIG. 7, objects 711 and 712 are block-formed on a page 701, thereby forming one block 721. Similarly, objects 713 and 714 are block-formed into one block 722 and objects 715 and 716 are block-formed into one block 723, respectively. Since the objects 711 and 712 are neighboring, a difference in the vertical direction between both objects is regarded to be 0. Thus, since the difference in the vertical direction between both objects is settled to the threshold value or less, both of them have been block-formed.

As illustrated in FIG. 7, in the embodiment, when the page layout is changed, all of the distances of the objects by the smallest segmentation are not considered but a "distance between the blocks" constructed by a certain number of objects is considered.

Figure 8:
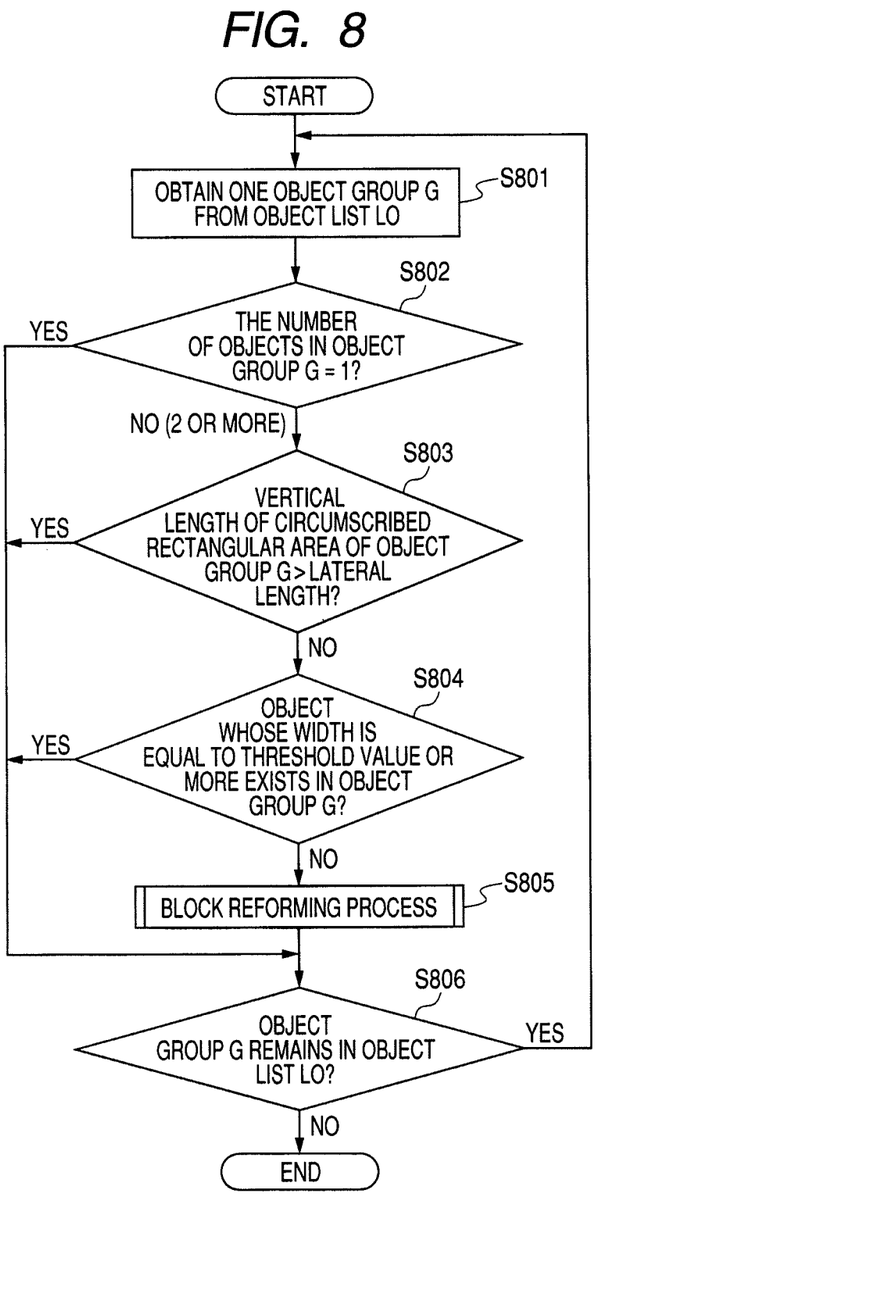
FIG. 8 is a flowchart showing the embodiment of the invention and describing an example of a process of the layout processing unit of the document managing apparatus at the time of discriminating whether or not the objects in an object group formed by the processes of the flowchart illustrated in FIG. 5 are block-reformed.

FIG. 8 is a flowchart for describing an example of a process of the layout processing unit of the document managing apparatus at the time of discriminating whether or not the objects in the object group G formed by the processes of the flowchart illustrated in FIG. 5 are block-reformed.

First, the layout processing unit obtains one object group G added in step S510 in FIG. 5 from the object list LO (step S801). Subsequently, the layout processing unit discriminates whether or not the number of objects in the object group G obtained in step S801 is equal to only one (step S802). If the number of objects in the object group G obtained in step S801 is equal to only one as a result of the discrimination, the layout processing unit discriminates whether or not the object group G which is not referred to yet remains in the object list LO (step S806). If the object group G which is not referred to yet does not remain as a result of the discrimination, the processes by the flowchart of FIG. 8 are finished. If the object group G which is not referred to yet remains, the processing routine is returned to step S801 mentioned above.

If the number of objects in the object group G obtained in step S801 is not equal to only one (there are two or more objects) in step S802, the layout processing unit executes the following processes. That is, the layout processing unit discriminates whether or not a vertical (vertical direction) length of an area of a circumscribed rectangle of the object group G obtained in step S801 is longer than a lateral (horizontal direction) length [whether or not an aspect ratio (vertical length/lateral length)>1] (step S803). If the vertical length of the area of the circumscribed rectangle of the object group G obtained in step S801 is longer than the lateral length as a result of the discrimination, the processing routine advances to step S806 mentioned above.

If the vertical length of the area of the circumscribed rectangle of the object group G obtained in step S801 is not longer than the lateral length, the layout processing unit executes the following processes. That is, the layout processing unit discriminates whether or not the object whose width (length in the horizontal direction) is equal to a threshold value or more exists in the object group G obtained in step S801 (step S804).

If the object whose width is equal to the threshold value or more exists in the object group G obtained in step S801 as a result of the discrimination, the processing routine advances to step S806 mentioned above. If the widths of all of the objects in the object group G obtained in step S801 are less than the threshold value, the layout processing unit executes a block reforming process according to a flowchart of FIG. 9 (step S805) and advances to step S806 mentioned above. As mentioned above, in the embodiment, for example, by executing the process of step S802, an example of a first discriminating unit is realized. By executing the process of step S803, an example of a second discriminating unit is realized. By executing the process of step S804, an example of a third discriminating unit is realized.

Figure 9:
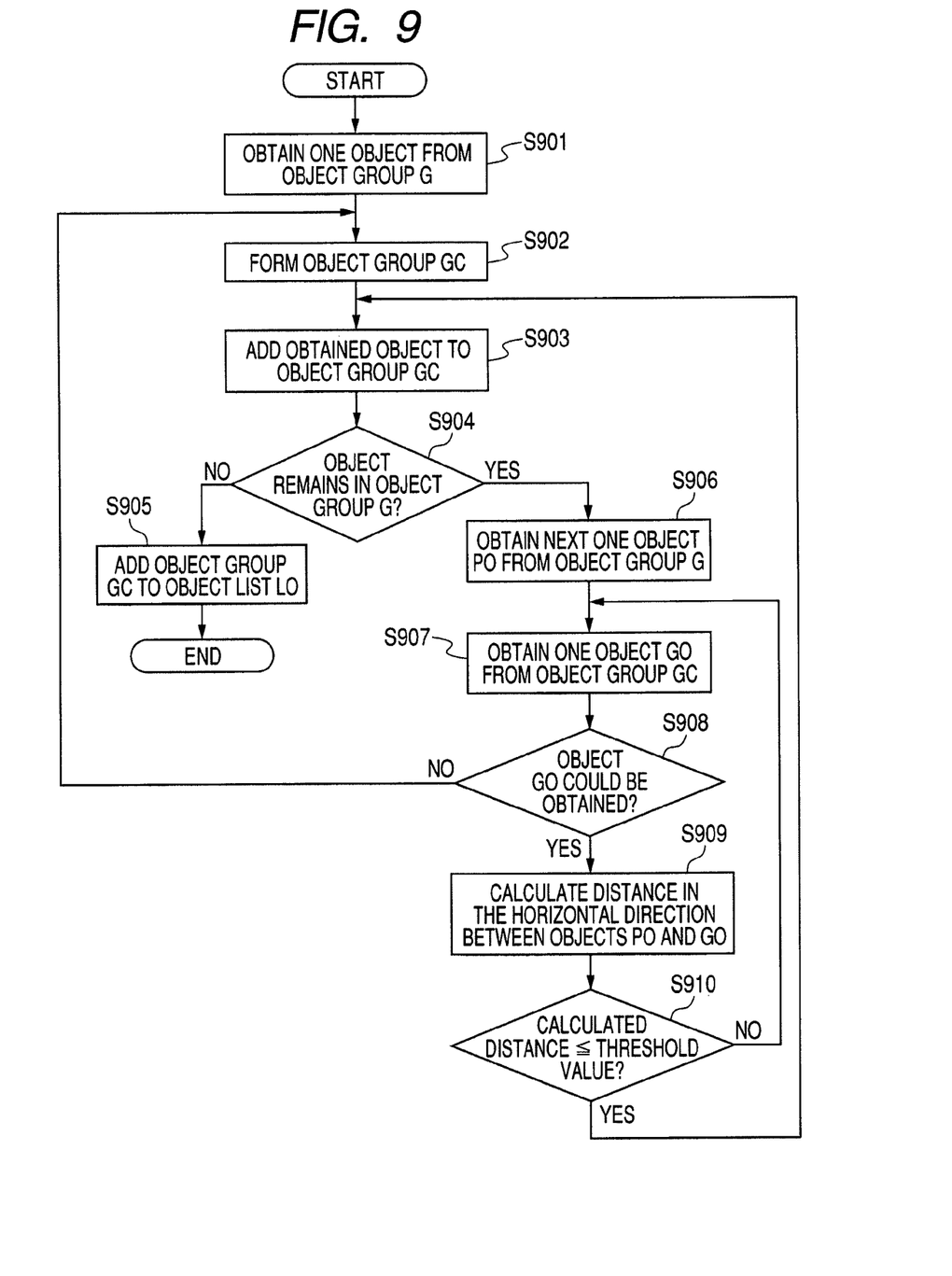
FIG. 9 is a flowchart showing the embodiment of the invention and describing in detail an example of a block reforming process in step S805 in FIG. 8.

FIG. 9 is the flowchart for describing in detail an example of the block reforming process in step S805 in FIG. 8. First, the layout processing unit obtains one object from the object group G obtained in step S801 in FIG. 8 (step S901). An example of the object group which is obtained in step S901 is the group 721 in FIG. 7. Subsequently, the layout processing unit forms a new object group GC (step S902). The object group GC has a format similar to that of the object list LO and has a data format in which the layout processing unit can operate as one object.

The object group GC has a relationship between parent and child together with the object group G. Therefore, when the object ID 201 of object group G is equal to "0001", the layout processing unit allocates "0001-1" or the like as an object ID of the object group GC. A fact that the object groups G and GC have the relationship between parent and child is shown in the object ID of the object group GC. However, it is not always necessary to construct as mentioned above but it is sufficient that a fact that the object groups G and GC have the relationship between parent and child is shown in at least one of the object IDs of the object groups G and GC.

As mentioned above, according to the embodiment, for example, the object ID of the object group G is an example of first group identification information and the object ID of the object group GC is an example of second group identification information. For example, by allocating the object ID to the object group G by the layout processing unit, an example of a first allocating unit is realized. By allocating the object ID to the object group GC by the layout processing unit, an example of a second allocating unit is realized.

Subsequently, the layout processing unit adds the object obtained in step S901 to the formed object group GC (step S903). An example of the object which is added in step S903 is a left object in the object group 721. Subsequently, the layout processing unit discriminates whether or not the object still remains in the object group G (step S904). If the object does not remain in the object group G as a result of the discrimination, the layout processing unit adds the object group GC to the object list LO (step S905). The processes according to the flowchart of FIG. 9 are finished.

If the object remains in the object group G, the layout processing unit obtains the next object PO from the object group G (step S906). An example of the object PO which is obtained in step S906 is a right object in the object group 721. Subsequently, the layout processing unit obtains one object GO from the object group GC (step S907). An example of the object which is obtained in step S907 is the left object in the object group 721. Subsequently, the layout processing unit discriminates whether or not the object GO could be obtained from the object group GC (step S908). If the object GO cannot be obtained from the object group GC as a result of the discrimination, the processing routine is returned to step S902 mentioned above. If the object GO could be obtained from the object group GC, the layout processing unit calculates a distance in the horizontal direction between the object PO obtained in step S906 and the object GO obtained in step S907 (step S909).

As mentioned above, in step S514 in FIG. 5, a shortest distance in the vertical direction between the circumscribed rectangles surrounding the objects is set to the distance between the objects. On the other hand, in step S909 in FIG. 9, a shortest distance in the horizontal direction between the circumscribed rectangles surrounding the objects is set to the distance between the objects.

Figure 10:
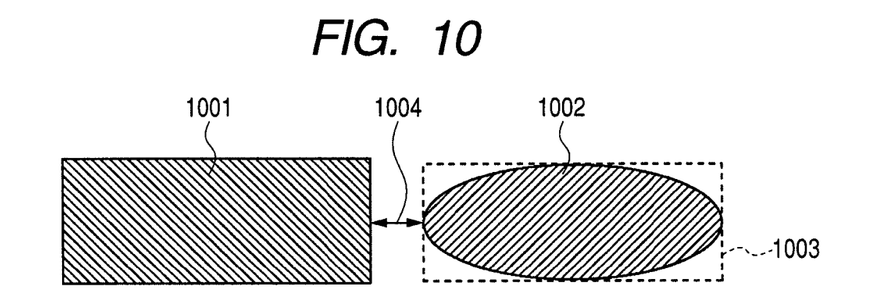
FIG. 10 is a diagram showing the embodiment of the invention and describing an example of a distance in the horizontal direction between two objects.

FIG. 10 is a diagram for describing an example of the distance in the horizontal direction between the two objects. In the example illustrated in FIG. 10, an object 1001 is a rectangle and an object 1002 is an ellipse. Therefore, the layout processing unit forms a circumscribed rectangle 1003 of the elliptical object 1002 and calculates a shortest distance 1004 in the horizontal direction between the circumscribed rectangle 1003 and the rectangular object 1001 as a distance in the horizontal direction between the two objects 1001 and 1002.

Figure 11:
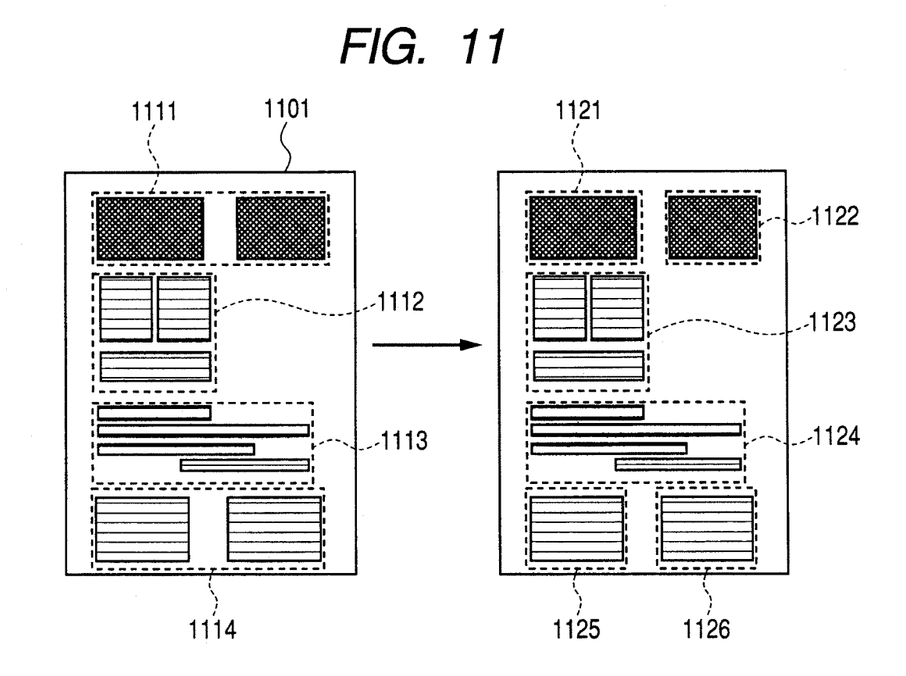
FIG. 11 is a diagram showing the embodiment of the invention and illustrating examples of a result obtained by block-forming the objects of the document based on the flowchart of FIG. 5 and a result obtained by further block-forming the objects of the document based on the flowcharts of FIGS. 8 and 9.

Returning to the description of FIG. 9, the layout processing unit discriminates whether or not the distance calculated in step S909 is equal to a threshold value or less (step S910). If the distance calculated in step S909 is larger than the threshold value as a result of the discrimination, the processing routine is returned to step S907 mentioned above. For example, if the distance between the objects in the group 721 in FIG. 7 is larger than the threshold value, after the block-reforming of S805 was executed, as illustrated in FIG. 11, the two (a plurality of) objects in the group 721 are grouped so as to belong to another object group. If the distance calculated in step S909 is equal to the threshold value or less, the processing routine is returned to step S903 mentioned above. For example, if the distance between the two objects in the group 721 in FIG. 7 is equal to the threshold value or less, even after the block-reforming was executed, the objects in the group 721 belong to the same group. The threshold value denotes a distance of a value which is predetermined in the system. In the embodiment, the objects to be block-formed by the threshold value of this distance are separated in the horizontal direction.

As mentioned above, in the embodiment, for example, the horizontal direction of the document is an example of a second direction, the distance calculated in step S909 is an example of a second distance, and the object group GC is an example of a second object group. For example, by executing the process of step S903, an example of a second grouping unit is realized.

FIG. 11 is a diagram illustrating examples of a result obtained by block-forming the objects of the document based on the flowchart of FIG. 5 and a result obtained by further block-forming the objects of the document based on the flowcharts of FIGS. 8 and 9. As illustrated in FIG. 11, a block 1111 is block-reformed into two blocks 1121 and 1122 on a page 1101. Similarly, a block 1114 is block-reformed into two blocks 1125 and 1126. A block 1112 is not block-reformed based on the discrimination result of step S803 in FIG. 8. A block 1113 is not block-reformed based on the discrimination result of step S804 in FIG. 8.

When a display of a state of the block set into the document is instructed based on the operation of the keyboard 132, mouse 133, or the like which is executed by the user, the layout processing unit extracts the object groups G and GC set for the document. The layout processing unit refers to the group IDs of the extracted object groups G and GC and can display the state of the block in the document designated by the user onto the display apparatus 144 based on the referred results. For example, any one of an image as illustrated on the right diagram of FIG. 7, an image as illustrated on the right diagram of FIG. 11, and both images of the left and right diagrams of FIG. 11 can be displayed onto the display apparatus 144 based on the operation of the user. Those display images can be also switched and displayed based on the operation of the user. Further, the user can be also allowed to select and edit the displayed groups. In addition, the user can be also allowed to select either the block forming process in which only the processes of FIG. 5 are executed or the block forming process in which the processes of FIGS. 5, 8, and 9 are executed.

As mentioned above, in the embodiment, for example, the layout processing unit refers to the group IDs of the object groups G and GC and displays the state of the block in the document designated by the user onto the display apparatus, so that an example of a display unit is realized.

As mentioned above, in the embodiment, the object list LO in which the information of each object included in the structured document has been collected in the list format is formed. The objects in each of which the distance in the vertical direction of the document is equal to the threshold value or less are included in one object group G and objects in the object group G are grouped as one group. After that, in the case where the length in the horizontal direction of the circumscribed rectangles of the two or more objects included in the object group G is equal to the length in the vertical direction or more and the length in the horizontal direction of at least one of the two or more objects is smaller than the threshold value, the block reforming process is executed. In the block reforming process, among the objects included in the object group G, the objects in each of which the distance in the horizontal direction is equal to the threshold value or less are grouped as one object group GC.

Therefore, there is no need to rasterize the drawing data in the structured document and to execute the image area separation by using technique such as histogram, graph dividing method, or the like. Consequently, the time that is required until the block-formation (extraction of the areas) is completed can be reduced to a time shorter than that in the related art.

A method of executing only the processes in FIG. 5 is considered in order to simply perform the block-formation of a plurality of objects in the document at a high speed. That is, the objects in the document are searched for in the vertical direction from the top and the searched objects are sequentially referred to. If the distance between the upper and lower objects is equal to the threshold value or less, they are block-formed and the block-forming area is sequentially widened. When the distance between the block-formed area and the object just under it is larger than the threshold value, they are regarded as different blocks. In the case of constructing as mentioned above, however, the block-forming area is formed only based on the distance in the vertical direction of the document. Therefore, for example, like a multicolumn layout of a character string, there is such a problem that even in the objects in which the distance in the horizontal direction therebetween is large, if the distance in the vertical direction is small, they are regarded as the same block.

A method whereby any one of steps S802 to S804 in FIG. 8 is not executed is also considered. For example, when steps S803 and S804 are not executed, the objects in which both of the distance in the vertical direction and the distance in the horizontal direction are equal to the threshold value or less are block-formed. If they are larger than the threshold value, the objects are set to different blocks. However, if the block forming process is simply executed as mentioned above, each block itself is microminiaturized, so that there is such a problem that convenience for the user is deteriorated and it takes a very long time for the processes of the block formation itself.

On the other hand, in the embodiment, the distance between the objects is referred to from both of the vertical direction and the horizontal direction for the structured document and only when the block-forming conditions (the number of objects, the aspect ratio of the circumscribed rectangular area, the object width) are satisfied, the block-formation is executed. Therefore, the unnecessary block forming process can be omitted as much as possible, the automatic block formation can be realized more simply, at a higher speed, and more accurately than those in the related art, and a much preferred embodiment is obtained.

In the embodiment, the relationship between parent and child, that is, between the object group G (parent) formed based on the distance in the vertical direction of the document and the object group GO (child) formed based on the distance in the horizontal direction of the document can be discriminated by the group IDs. Therefore, the state of the block can be displayed or the selection can be switched according to an application of the user.

In the embodiment, the case where the object group G is formed based on the distance in the vertical direction of the document and, thereafter, the object group GO in which the object group G has been further fined is formed based on the distance in the horizontal direction of the document has been described as an example. However, after the object group was formed based on the distance in the horizontal direction of the document, the object group in which the object group has been further fined may be formed based on the distance in the vertical direction of the document. In such a case, for example, in step S803 in FIG. 8, whether or not the lateral length of the area of the circumscribed rectangle of the object group G is longer than the vertical length may be discriminated. In step S804, whether or not the object in which the height (vertical length) of the object is equal to the threshold value or more exists in the object group G may be discriminated.

In the embodiment, as a discrimination reference adapted to discriminate whether or not the attributes of the object group G satisfy the predetermined conditions, the case where the three discrimination references of steps S802 to S804 has been described as an example. However, it is not always necessary to use such a construction. For example, at lease one (only step S802, steps S802 and S803, steps S802 and S804, or the like) of the three discrimination references of steps S802 to S804 can be used. According to the invention, the objects can be grouped even if the technique such as histogram, graph dividing method, or the like is not used. Consequently, the area of the document image can be block-formed at a speed higher than that in the related art.

(Another Embodiment of the Invention)

The invention can be also realized by executing the following processes, that is: a process in which software (program) for realizing the functions of the embodiments mentioned above is supplied to a system or an apparatus through a network or various kinds of storage media and a computer (or a CPU, an MPU, or the like) of the system or apparatus reads out and executes the program. In this case, the program and the storage medium in which the program has been stored construct the invention.

This application claims the benefit of Japanese Patent Application No. 2008-182036, filed Jul. 11, 2008, which is hereby incorporated by reference herein in its entirety.

The invention claimed is:

1. A document managing apparatus for editing first and second objects on a page, comprising:
   a central processing unit performing the functions of:
      generating a first object group;
      determining, based on positions of first and second objects on the page, whether a distance in a vertical direction between the first and second objects is equal to or less than a threshold;
      when the first determination unit determines that the distance is equal to or less than the threshold, adding the first and second objects to the first object group generated by the generating unit; and
      determining whether the length in a horizontal direction of the first object group, to which the first and second objects are added by the adding unit, is longer than the length in a vertical direction of the first object group; and
      determining whether the length in the horizontal direction of the first or second object is less than the threshold, when the second determination unit determines that the length in the horizontal direction of the first object group is longer than the length in the vertical direction of the first object group; and
   a display that displays a result of grouping the first and second objects,
   wherein the central processing unit generates a second object group when the central processing unit determines that the length in the horizontal direction of the first or second object is less than the threshold,
   wherein the central processing unit adds the second object to the second object group generated by the central processing unit,
   wherein the display displays (a) a first grouping result indicating that the first and second objects are included in the first object group and (b) a second grouping result indicating that the first object is included in the first object group and the second object is included in the second object group, such that a switching is made between the first and second grouping results.

2. The document managing apparatus according to claim 1, wherein the central processing unit further performs the functions of:
   allocating first group identification information for identifying the first object group to the first object group; and
   allocating second group identification information for identifying the second object group to the first object group,
   and wherein a fact that the first object group which is identified by the first group identification information and the second object group to which the second object of the first object group is added have a relationship between parent and child is shown in at least either the first group identification information or the second group identification information.

3. The document managing apparatus according to claim 2, wherein the display displays information regarding a group of the objects based on the first group identification information allocated by the central processing unit and the second group identification information allocated by the central processing unit.

4. The document managing apparatus according to claim 1, wherein the first direction is a vertical direction of the document and the second direction is a horizontal direction of the document.

5. A document managing method for editing first and second objects on a page, comprising the steps of:
   generating a first object group;
   determining in a first determining step, based on positions of first and second objects on the page, whether a distance in a vertical direction between the first and second objects is equal to or less than a threshold;

adding the first and second objects to the first object group generated by the generating step when the first determining step determines that the distance is equal to or less than the threshold;

determining in a second determining step whether the length in a horizontal direction of the first object group, to which the first and second objects are added by the adding step, is longer than the length in a vertical direction of the first object group;

determining in a third determining step whether the length in the horizontal direction of the first or second object is less than the threshold, when the second determination step determines that the length in the horizontal direction of the first object group is longer than the length in the vertical direction of the first object group; and displaying with a display unit a result of grouping the first and second objects, wherein the generating step generates a second object group when the third determination step determines that the length in the horizontal direction of the first or second object is less than the threshold, wherein the adding step adds the second object to the second object group generated by the generating step, wherein the displaying step displays with the displaying unit displays (a) a first grouping result indicating that the first and second objects are included in the first object group and (b) a second grouping result indicating that the first object is included in the first object group and the second object is included in the second object group, such that a switching is made between the first and second grouping results, and wherein the generating, first determining, second determining, third determining, and adding steps are performed by a central processing unit.

6. A non-transitory computer-readable storage medium which stores a program instructing a computer to execute a method for editing first and second objects on a page comprising the steps of:

generating a first object group;

determining in a first determining step, based on positions of first and second objects on the page, whether a distance in a vertical direction between the first and second objects is equal to or less than a threshold;

adding the first and second objects to the first object group generated by the generating step when the first determining step determines that the distance is equal to or less than the threshold;

determining in a second determining step whether the length in a horizontal direction of the first object group, to which the first and second objects are added by the adding step, is longer than the length in a vertical direction of the first object group;

determining in a third determining step whether the length in the horizontal direction of the first or second object is less than the threshold, when the second determining step determines that the length in the horizontal direction of the first object group is longer than the length in the vertical direction of the first object group; and displaying with a display unit a result of grouping the first and second objects, wherein the generating step generates a second object group when the third determining step determines that the length in the horizontal direction of the first or second object is less than the threshold, wherein the adding step adds the second object to the second object group generated by the generating step, wherein the displaying step displays (a) a first grouping result indicating that the first and second objects are included in the first object group and (b) a second grouping result indicating that the first object is included in the first object group and the second object is included in the second object group, such that a switching is made between the first and second grouping results, and wherein the generating, first determining, second determining, third determining, and adding steps are performed by a central processing unit.

\* \* \* \* \*